US012404144B2

(12) United States Patent
Yuan

(10) Patent No.: US 12,404,144 B2
(45) **Date of Patent: *Sep. 2, 2025**

(54) SELF-WINDING HOSE REELS FOR PRESSURE WASHERS

(71) Applicant: Duro Industries, LLC, Dover, DE (US)

(72) Inventor: Yue Yuan, Dover, DE (US)

(73) Assignee: Duro Industries, LLC, Dover, DE (US)

( * ) Notice: Subject to any disclaimer, the term of this patent is extended or adjusted under 35 U.S.C. 154(b) by 215 days.

This patent is subject to a terminal disclaimer.

(21) Appl. No.: 18/367,680

(22) Filed: Sep. 13, 2023

(65) Prior Publication Data

US 2025/0083925 A1 Mar. 13, 2025

(51) Int. Cl.

| | |
|---|---|
| ***B65H 75/42*** | (2006.01) |
| ***B05B 7/04*** | (2006.01) |
| ***B05B 9/00*** | (2006.01) |
| ***B05B 9/04*** | (2006.01) |
| ***B08B 3/02*** | (2006.01) |
| ***B65H 75/48*** | (2006.01) |

(52) U.S. Cl.

CPC ........... *B65H 75/42* (2013.01); *B05B 7/0408* (2013.01); *B05B 9/007* (2013.01); *B05B 9/0426* (2013.01); *B08B 3/026* (2013.01); *B08B 2203/0276* (2013.01); *B65H 75/48* (2013.01); *B65H 2701/33* (2013.01); *Y10T 137/6958* (2015.04)

(58) Field of Classification Search

CPC ......... B05B 1/24; B05B 7/0408; B05B 9/007; B05B 9/04; B05B 9/0403; B05B 9/0426; B05B 15/60; B08B 3/026; B08B 3/028; B08B 2203/027; B08B 2203/0276; B65H 75/40; B65H 75/403; B65H 75/42; B65H 75/425; B65H 75/48; B65H 2701/33; F02B 63/047; F02B 63/06; F02B 2063/045; F04B 17/05; F04B 17/06; Y10T 137/6899; Y10T 137/6918–6962

USPC ........................... 137/355.12, 355.16–355.28

See application file for complete search history.

(56) References Cited

U.S. PATENT DOCUMENTS 4,135,669 A * 1/1979 Bridges ................... B05B 9/007 239/391
4,238,074 A 12/1980 Coons
4,700,422 A * 10/1987 Russell ................... B08B 9/045 134/168 C (Continued)

FOREIGN PATENT DOCUMENTS

| | | | |
|---|---|---|---|
| BR | MU90014812 | U2 | 12/2012 |
| WO | 2019206395 | A1 | 10/2019 |

*Primary Examiner* — Kenneth Rinehart
*Assistant Examiner* — Jonathan J Waddy
(74) *Attorney, Agent, or Firm* — Georgiy L. Khayet

(57) ABSTRACT

An assembly for high-pressure cleaning and a method for manufacturing an assembly for high-pressure cleaning are provided. The assembly includes a self-winding hose reel, a pressure washer, and a fastening mechanism. The pressure washer includes a pump and a frame. The frame includes a first side pipe and a second side pipe parallel to the first side pipe. The fastening mechanism is designed to secure the self-winding hose reel to the frame between the first side pipe and the second side pipe. The fastening mechanism allows rotation of the self-winding hose reel with respect to a plane formed by the first side pipe and the second side pipe.

4 Claims, 14 Drawing Sheets

(56) References Cited

U.S. PATENT DOCUMENTS

| | | | | |
|---|---|---|---|---|
| 4,700,737 | A | 10/1987 | Nelson | |
| 4,773,113 | A * | 9/1988 | Russell | E03F 9/005 15/4 |
| 5,419,497 | A * | 5/1995 | Warrington | A62C 27/00 239/722 |
| 5,653,584 | A * | 8/1997 | Mazzucato | F04B 53/00 417/364 |
| 5,980,220 | A * | 11/1999 | Mazzucato | F04B 1/148 417/364 |
| 6,761,135 | B1 | 7/2004 | Becktold | |
| 6,935,642 | B1 * | 8/2005 | Craig | F04B 17/06 280/47.24 |
| 8,398,097 | B2 * | 3/2013 | Junk | B08B 3/026 417/364 |
| 8,915,231 | B2 * | 12/2014 | Raasch | F02D 31/00 123/363 |
| 10,888,887 | B2 | 1/2021 | Masters | |
| D925,845 | S * | 7/2021 | Alexander | D32/15 |
| D932,717 | S * | 10/2021 | Xu | D32/15 |
| 2006/0076779 | A1 * | 4/2006 | Craig | F02B 63/04 290/1 A |
| 2009/0272412 | A1 | 11/2009 | Steinhauser et al. | |
| 2011/0253229 | A1 * | 10/2011 | Mattson | B05B 7/0093 137/355.16 |
| 2012/0018534 | A1 * | 1/2012 | Gilpatrick | B05B 7/0876 239/310 |
| 2012/0241537 | A1 * | 9/2012 | Schwei | B05B 9/007 239/147 |
| 2014/0119949 | A1 * | 5/2014 | Wischstadt | F04B 17/05 417/34 |
| 2015/0102121 | A1 * | 4/2015 | Dey | B05B 9/01 239/69 |
| 2016/0167869 | A1 * | 6/2016 | Gilpatrick | F04B 53/18 222/251 |
| 2017/0304873 | A1 | 10/2017 | Luby et al. | |
| 2018/0021800 | A1 * | 1/2018 | Janik | B05B 15/62 239/146 |
| 2018/0133729 | A1 * | 5/2018 | Masters | A47L 11/4091 |
| 2019/0299236 | A1 * | 10/2019 | Rancourt | F04B 17/05 |
| 2020/0001313 | A1 * | 1/2020 | Bindl | B05B 12/006 |
| 2020/0023399 | A1 * | 1/2020 | Gordon | B05B 9/007 |
| 2020/0171522 | A1 | 6/2020 | Sugiura | |
| 2021/0078049 | A1 * | 3/2021 | Nushart | E01H 1/101 |
| 2022/0339655 | A1 * | 10/2022 | Wuerfl | B05B 9/0861 |
| 2024/0240442 | A1 * | 7/2024 | Sphar | E03C 1/302 |

* cited by examiner

SELF-WINDING HOSE REELS FOR PRESSURE WASHERS

TECHNICAL FIELD

This disclosure relates to pressure washers. More specifically, this disclosure relates to self-winding hose reels for pressure washers.

BACKGROUND

Pressure washer systems operate by propelling pressurized water and are widely used for cleaning various surfaces to effectively remove dirt, grime, and contaminants from the surfaces. Pressure washers usually have an engine acting as a power source for driving the pressure washer, a pump for pressurizing the water, a frame for providing structural support and protection for components of the pressure washer, a spray nozzle for controlling the shape and intensity of a water stream, and a high-pressure water hose that connects a pump outlet to the spray nozzle. Pressure washers may have other components depending on the specific model and type of a pressure washer.

The high-pressure water hose serves as a conduit through which pressurized water is delivered from the pump to the spray nozzle. Conventional pressure washers, for example, models widely sold in the North American market, have loose high-pressure water hoses that hang on a side or in the middle of handles of the pressure washers. Users have to wrap and unwrap the high-pressure water hoses by hand. Since the high-pressure water hoses are very stiff, the users may experience difficulties when handling the high-pressure water hoses.

Some conventional pressure washers, for example, models provided on the European market, have a manual hose reel on them. The manual hose reel may be connected to a frame of the pressure washer and used for convenient storage and management of the high-pressure water hoses when not in use. Operating the manual hose reel requires physical effort to manually crank a handle to wind or unwind the high-pressure water hose. This can become tiresome for users, especially if the high-pressure water hose is long and heavy.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment of the present disclosure, an assembly for high-pressure cleaning is provided. The assembly may include a self-winding hose reel, a pressure washer, and a fastening mechanism. The pressure washer may include a pump and a frame. The frame may include a first side pipe and a second side pipe parallel to the first side pipe. The fastening mechanism may be designed to secure the self-winding hose reel to the frame between the first side pipe and the second side pipe.

According to another embodiment of the present disclosure, a method for manufacturing an assembly for high-pressure cleaning is provided. The method may commence with providing a self-winding hose reel. The method may proceed with providing a pressure washer. The pressure washer may include a pump and a frame. The frame may include a first side pipe and a second side pipe parallel to the first side pipe. The method may proceed with providing a fastening mechanism designed to secure the self-winding hose reel to the frame between the first side pipe and the second side pipe.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Figure 1:
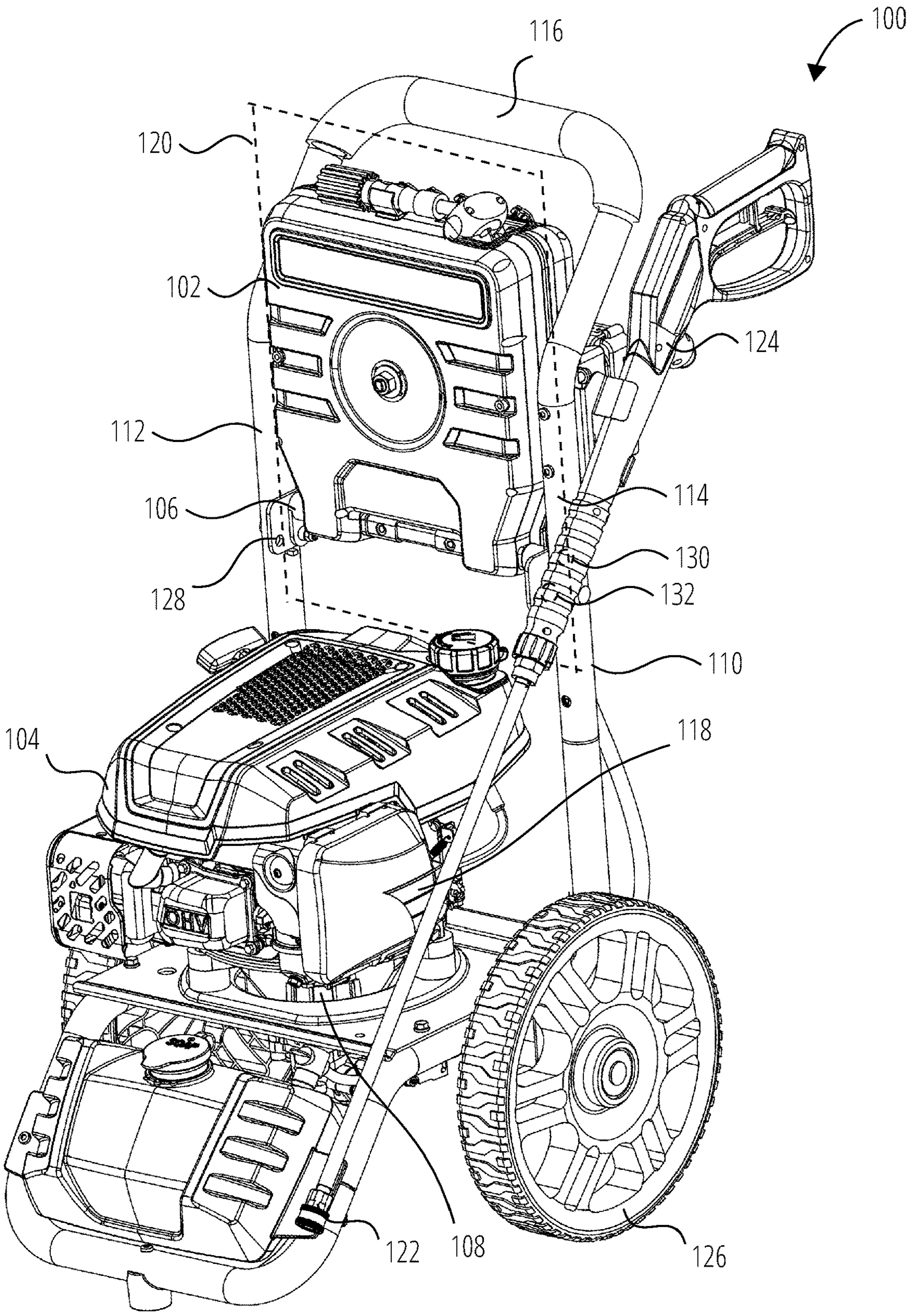
FIG. 1 is a front perspective view of an assembly for high-pressure cleaning with a vertical shaft engine powered pressure washer and a self-winding hose reel, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to assemblies for high-pressure cleaning. An assembly for high-pressure cleaning may include a pressure washer, a self-winding hose reel, and a fastening mechanism for the self-winding hose reel. The pressure washer may include a pump and a frame. The frame may have a first side pipe and a second side pipe parallel to the first side pipe. The fastening mechanism may be designed to secure the self-winding hose reel to the frame between the first side pipe and the second side pipe.

The self-winding hose reel may include a water hose, a drum onto which the water hose is wound, a spring disposed in the drum, and a housing for accommodating the components of the self-winding hose reel. The spring actuating the rotation of the drum allows the water hose to be automatically wound up inside the housing of the self-winding hose reel after use.

The pressure washer may include any type of pressure washer available on the market. In example embodiments, the pressure washer may include a pressure washer powered by a vertical shaft engine and a pressure washer powered by a horizontal shaft engine. The present disclosure provides several example embodiments for attaching the self-winding hose reel to these types of pressure washers.

In the vertical shaft engine powered pressure washer, a pump is installed under a vertical shaft engine, i.e., on the bottom of the pressure washer. For this type of pressure washers, the self-winding hose reel may be arranged over the vertical shaft engine. The self-winding hose reel may be attached by the fastening mechanism to a handle of the pressure washer. The handle may be a part of a frame of the pressure washer. The fastening mechanism may be configured to enable the self-winding hose reel to rotate between a horizontal position and a vertical position. Specifically, the self-winding hose reel may fold down into the horizontal position during the operation of the pressure washer and may fold up into the vertical position when access to a fuel tank or other elements of the pressure washer is needed.

In the horizontal shaft engine powered pressure washer, the pump is installed beside a horizontal shaft engine. There are two structures of the pressure washers powered by horizontal shaft engines: a vertical style pressure washer and a horizontal style pressure washer. The vertical style pressure washer powered by a horizontal shaft engine has bigger wheels on the rear side of the pressure washer and a vertical type handle. For this type of pressure washer, the self-winding hose reel is arranged under the horizontal shaft engine, i.e., on the bottom of the pressure washer, and is attached by the fastening mechanism to a frame of the pressure washer.

The horizontal style pressure washer powered by a horizontal shaft engine has smaller wheels on the front side of the pressure washer and a horizontal type handle. For this type of pressure washer, the self-winding hose reel is arranged on the horizontal type handle.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 is a front perspective view of an assembly for high-pressure cleaning shown as an assembly 100, according to an example embodiment. The assembly 100 may include a self-winding hose reel 102, a pressure washer 104, and a fastening mechanism 106 designed to secure the self-winding hose reel 102 to the pressure washer 104. The pressure washer 104 may include one of the following: an electrically powered high-pressure washer, a gasoline engine powered high-pressure washer, and any other type of pressure washer.

The pressure washer 104 may include a frame 110. The frame 110 may provide structural support and protection for the components of the pressure washer 104. The frame 110 may include a first side pipe 112 and a second side pipe 114 parallel to the first side pipe 112. The fastening mechanism 106 may be configured to secure the self-winding hose reel 102 to the frame 110 between the first side pipe 112 and the second side pipe 114. The frame 110 may further include a handle 116 connecting the first side pipe 112 and the second side pipe 114. A user may use the handle 116 to navigate the assembly 100.

The assembly 100 shown in FIG. 1 includes the pressure washer 104 powered by a vertical shaft engine 118. Therefore, the assembly 100 is a vertical shaft engine powered pressure washer with a self-winding hose reel. The pressure washer 104 may further include a pump 108. The pump 108 may be located under the vertical shaft engine 118. For example, the pump 108 may be arranged on an axis of a shaft of the vertical shaft engine 118. In the example embodiment shown in FIG. 1 and FIG. 2, the self-winding hose reel 102 may be secured above the vertical shaft engine 118.

The fastening mechanism 106 may allow rotation of the self-winding hose reel 102 with respect to a plane 120 formed by the first side pipe 112 and the second side pipe 114. Specifically, the fastening mechanism 106 may be configured to enable the self-winding hose reel 102 to rotate between a vertical position and a horizontal position. FIG. 1 shows the assembly 100 with the self-winding hose reel 102 in a vertical position, in which the self-winding hose reel 102 is secured in the plane 120 formed by the first side pipe 112 and the second side pipe 114. The self-winding hose reel 102 may be folded up into the vertical position when access to components (e.g., a fuel tank) of the pressure washer located below the self-winding hose reel 102 is needed.

The assembly 100 may have other components required for the operation of the assembly 100, such as a spray nozzle 122 configured to control the shape and intensity of the water stream, a trigger gun 124 for activating the flow of pressurized water from the pump 108 to the spray nozzle 122, wheels 126 for easy maneuverability and transport, and so forth.

The fastening mechanism 106 may further include a first pin hole (shown as a first pin hole 306 in FIG. 3B), a second pin hole 128, a third pin hole 130, and a fourth pin hole 132. The pin holes are described in more detail below with reference to FIG. 3A and FIG. 3B.

Figure 2:
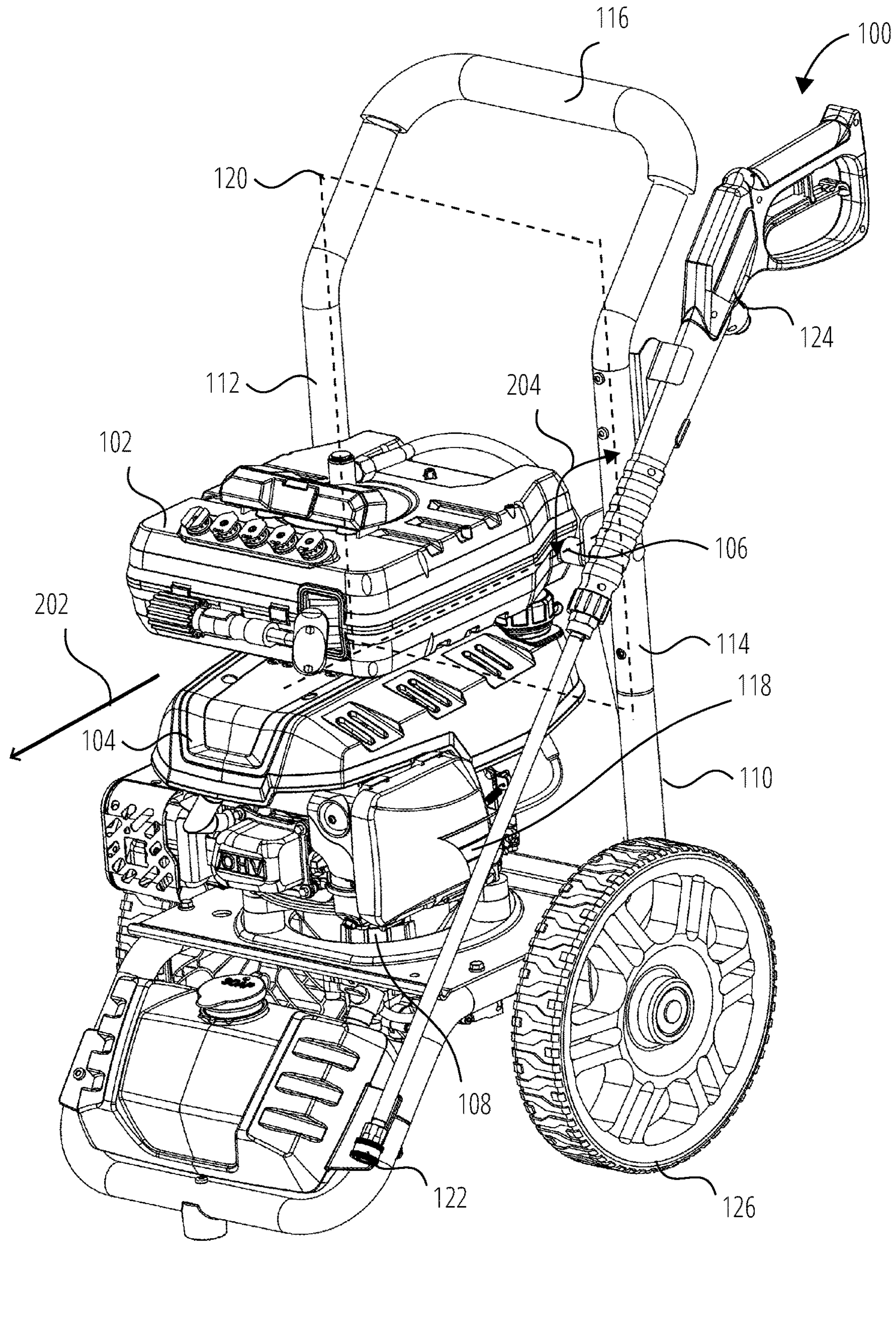
FIG. 2 is a front perspective view of an assembly for high-pressure cleaning with a self-winding hose reel in a horizontal position, according to an example embodiment.

FIG. 2 is a front perspective view of the assembly 100 with the self-winding hose reel 102 in a horizontal position, according to an example embodiment. The self-winding hose reel 102 may be folded down from the vertical position shown in FIG. 1 into the horizontal position shown in FIG. 2 using the fastening mechanism 106. The self-winding hose reel 102 may be in the horizontal position during the operation of the pressure washer 104. In the example embodiment, the self-winding hose reel 102 may be arranged on the frame 110 to extend a water hose located in the self-winding hose reel 102 in the direction outwards from a front side of the assembly 100, as shown by an arrow 202 in FIG. 2.

The fastening mechanism 106 may be configured to secure the self-winding hose reel 102 with respect to the plane 120 formed by the first side pipe 112 and the second side pipe 114 at a pre-determined non-zero angle 204. In an example embodiment, the pre-determined non-zero angle 204 at which the self-winding hose reel 102 is secured with respect to the plane 120 is about 90 degrees. When the self-winding hose reel 102 is secured at the pre-determined non-zero angle 204, the self-winding hose reel 102 may be arranged over the vertical shaft engine 118.

In an example embodiment, when the self-winding hose reel 102 is secured at the pre-determined non-zero angle 204, the self-winding hose reel 102 may be arranged parallel to the pump 108.

Figure 3A:
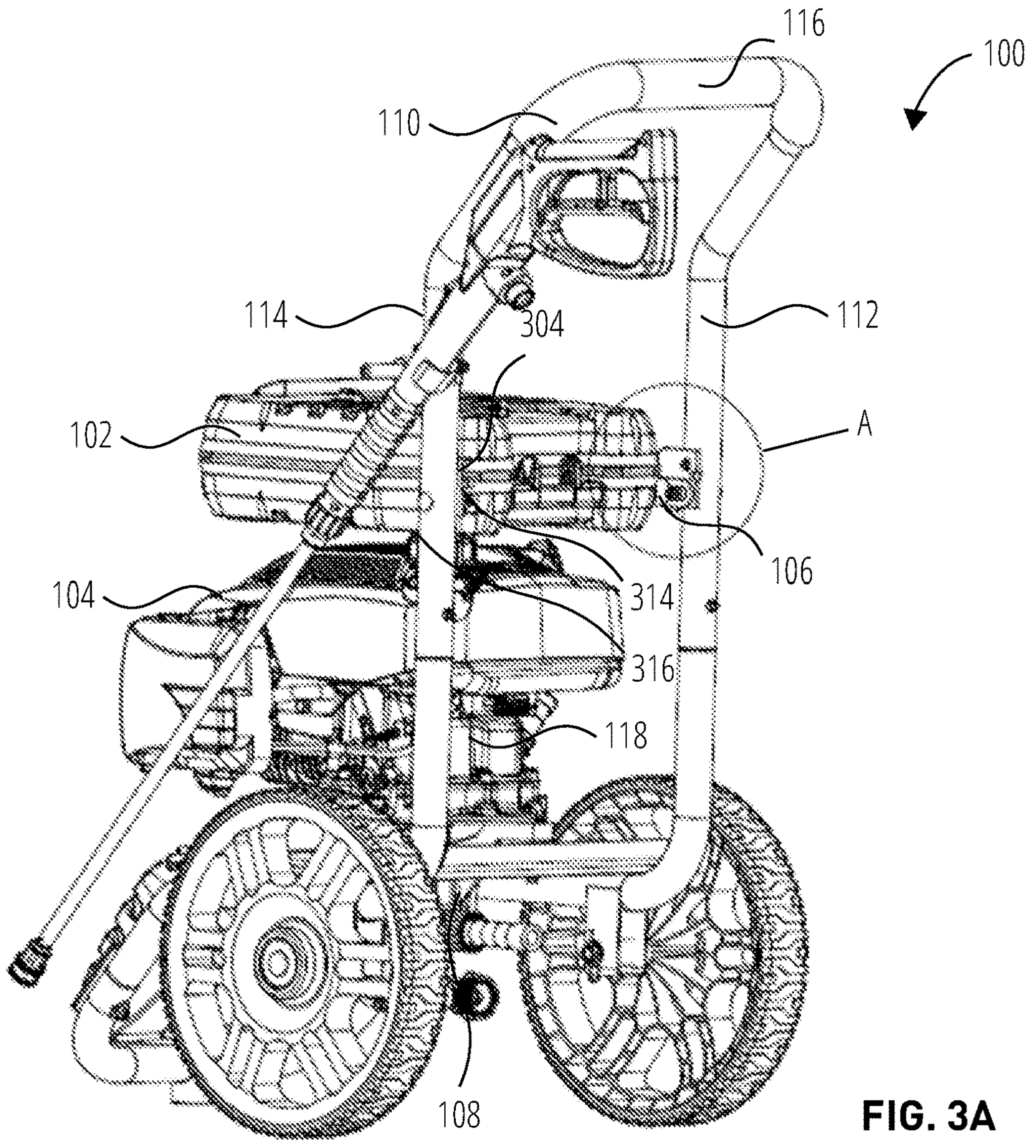
FIG. 3A is a rear perspective view of an assembly for high-pressure cleaning with a self-winding hose reel in a horizontal position, according to an example embodiment.
Figure 3B:
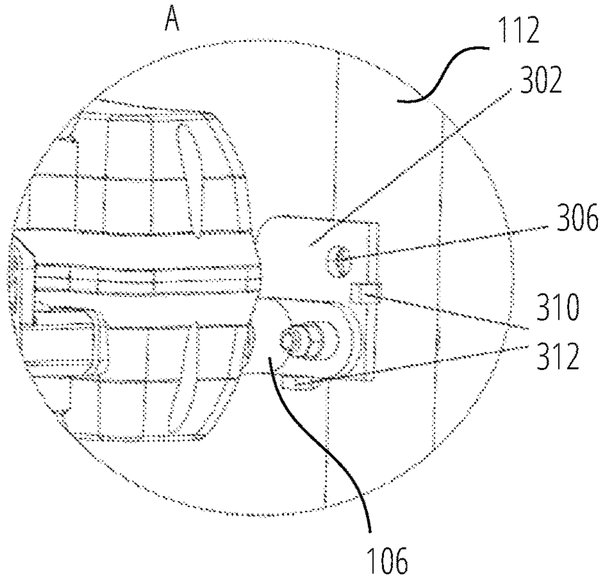
FIG. 3B is a detailed view of a fastening mechanism, according to an example embodiment.

FIG. 3A is a rear perspective view of the assembly 100 with the self-winding hose reel 102 in a horizontal position, according to an example embodiment. FIG. 3B is a detailed view A of the fastening mechanism 106, according to an example embodiment.

As shown in FIG. 3A and FIG. 3B, the fastening mechanism 106 may include a first plate 302 mounted to the first side pipe 112 and a second plate 304 mounted to the second side pipe 114. The first plate 302 may include a first pin hole 306 and a second pin hole 128 (shown in FIG. 1). The second plate 304 may include a third pin hole 130 (shown in FIG. 1) and a fourth pin hole 132 (shown in FIG. 1).

Two position limiters may be located on each plate to ensure the right vertical position and the right horizontal position of the self-winding hose reel 102. Specifically, as shown in FIG. 3B, the first plate 302 may include a first limiter 310 and a second limiter 312. Similarly, as shown in FIG. 3A, the second plate 304 may include a third limiter 314 and a fourth limiter 316. The first limiter 310 and the third limiter 314 may be designed to ensure a first position of the self-winding hose reel 102 in the plane 120 formed by the first side pipe 112 and the second side pipe 114. Specifically, upon rotating the self-winding hose reel 102 by the fastening mechanism 106 from a horizontal position into a vertical position in which the self-winding hose reel 102 is located in the plane 120, the first limiter 310 and the third limiter 314 may restrict further movement of the fastening mechanism 106. Therefore, the first limiter 310 and the third limiter 314 may prevent the self-winding hose reel 102 from further rotation and keep the self-winding hose reel 102 within the plane 120.

The second limiter 312 and the fourth limiter 316 may be designed to ensure a second position of the self-winding hose reel 102 at the pre-determined non-zero angle 204 with respect to the plane 120 formed by the first side pipe 112 and the second side pipe 114. Specifically, upon rotating the self-winding hose reel 102 by the fastening mechanism 106 from a vertical position to a horizontal position, in which the self-winding hose reel 102 is located at the pre-determined non-zero angle 204 with respect to the plane 120, the second limiter 312 and the fourth limiter 316 may restrict further movement of the fastening mechanism 106. Therefore, the second limiter 312 and the fourth limiter 316 may prevent the self-winding hose reel 102 from further rotation and keep the self-winding hose reel 102 at the pre-determined non-zero angle 204 with respect to the plane 120.

Figure 4:
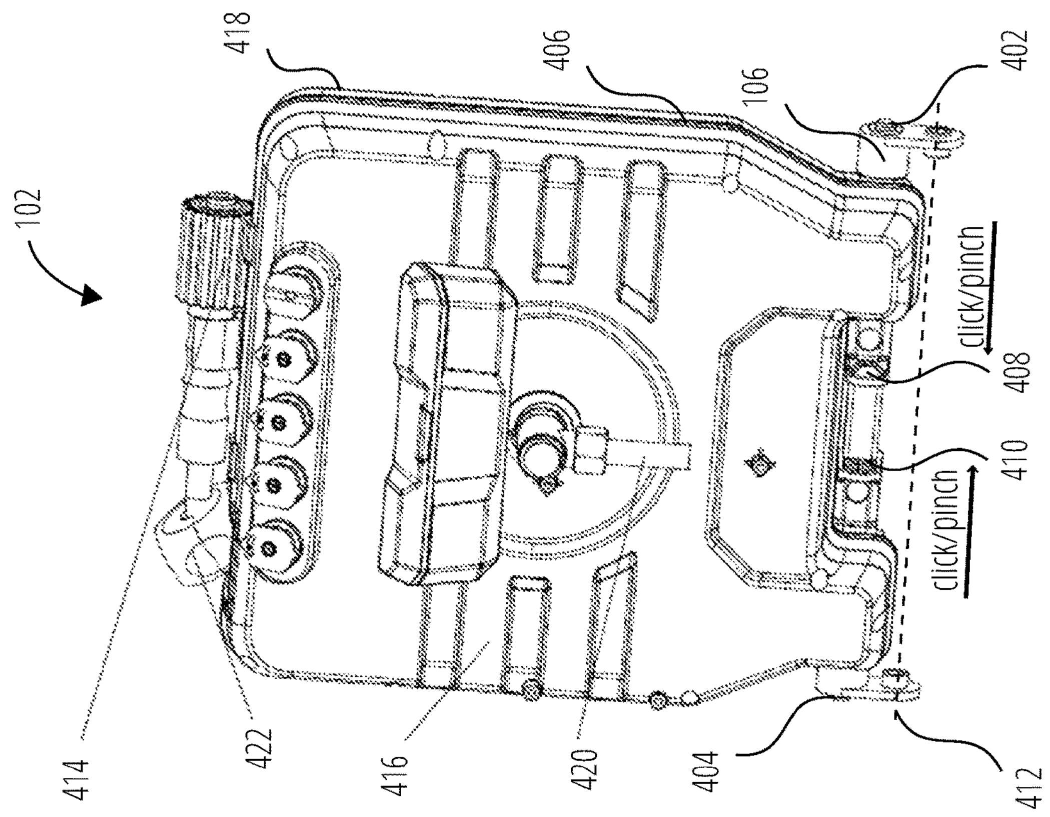
FIG. 4 is a general view of a self-winding hose reel connected to a fastening mechanism, according to an example embodiment.

FIG. 4 is a general view of the self-winding hose reel 102 connected to the fastening mechanism 106, according to an example embodiment. The self-winding hose reel 102 may have a housing 406 enclosing the components of the self-winding hose reel 102. The fastening mechanism 106 may further include two spring loaded latch pins located on both sides of the housing 406 of the self-winding hose reel 102. Specifically, the fastening mechanism 106 may include a first spring loaded latch pin 402 attached to one side of the housing 406 of the self-winding hose reel 102 and a second spring loaded latch pin 404 attached to the other side of the housing 406 of the self-winding hose reel 102. When the self-winding hose reel 102 is secured in the plane 120 formed by the first side pipe 112 and the second side pipe 114 (i.e., the self-winding hose reel 102 is in a vertical position as shown in FIG. 1), the first spring loaded latch pin 402 may be engaged with the first pin hole 306 and the second spring loaded latch pin 404 may be engaged with the third pin hole 130. When the self-winding hose reel 102 is secured at the pre-determined non-zero angle 204 (i.e., the self-winding hose reel 102 is in a horizontal position as shown in FIG. 2), the first spring loaded latch pin 402 may be engaged with the second pin hole 128 (shown in FIG. 1) and the second spring loaded latch pin 404 may be engaged with the fourth pin hole 132 (shown in FIG. 1).

The fastening mechanism 106 may be configured to rotate the self-winding hose reel 102 around an axis 412 from a vertical position used for storage of the assembly 100 by about 90 degrees to a horizontal position used for operation of the assembly 100. To actuate rotation of the self-winding hose reel 102, the fastening mechanism 106 may include a first button 408 and a second button 410. The first button 408 may be designed to release the first spring loaded latch pin 402 from either the first pin hole 306 or the second pin hole 128. The second button 410 may be designed to release the second spring loaded latch pin 404 from either the third pin hole 130 or the fourth pin hole 132.

The first button 408 and the second button 410 may be clicked or pinched to retract the first spring loaded latch pin 402 out of the first pin hole 306 and/or the second pin hole 128 and retract the second spring loaded latch pin 404 out of the third pin hole 130 and/or the fourth pin hole 132. In an example embodiment, the self-winding hose reel 102 may be in a vertical position with the first spring loaded latch pin 402 engaged with the first pin hole 306 and the second spring loaded latch pin 404 engaged with the third pin hole 130. Upon clicking the first button 408 and the second button 410, the first spring loaded latch pin 402 may be retracted out of the first pin hole 306 and the second spring loaded latch pin 404 may be retracted out of the third pin hole 130. Then, the housing 406 of the self-winding hose reel 102 may be rotated clockwise by about 90 degrees.

Upon rotation of the housing 406, the first button 408 and the second button 410 may be released, thereby causing the first spring loaded latch pin 402 to engage with the second pin hole 128 and causing the second spring loaded latch pin 404 to engage with the fourth pin hole 132 to secure the self-winding hose reel 102 in a horizontal position for operation of the self-winding hose reel 102.

Figure 5:
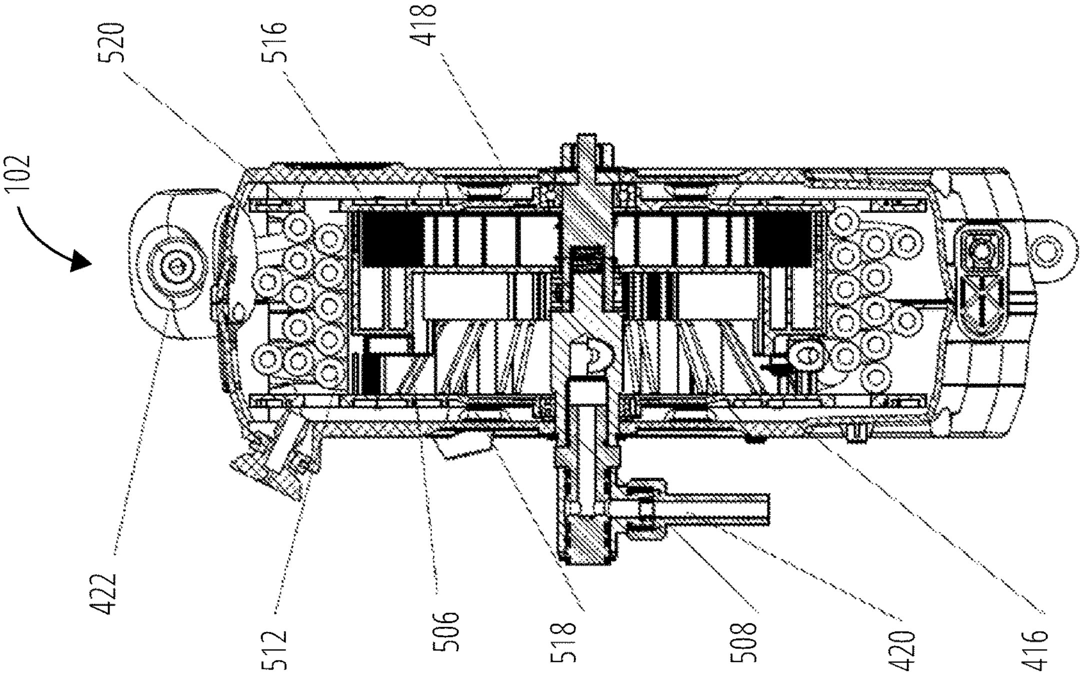
FIG. 5 is a side cross-sectional view of a self-winding hose reel, according to an example embodiment.

FIG. 5 is a side cross-sectional view of the self-winding hose reel 102, according to an example embodiment. Components of the self-winding hose reel 102 are further shown in detail in FIG. 6.

Figure 6:
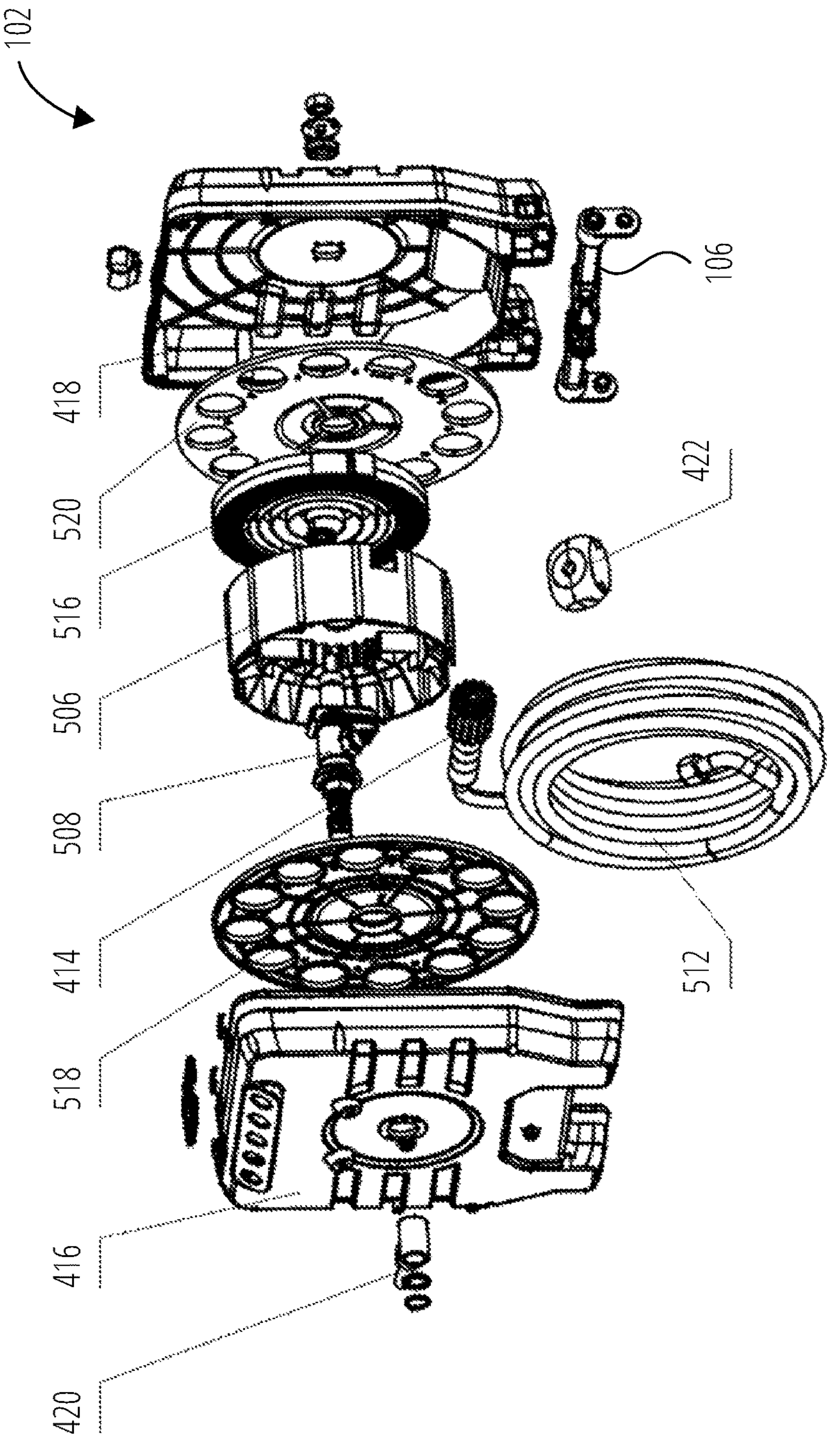
FIG. 6 is an expanded view of a self-winding hose reel, according to an example embodiment.

FIG. 6 is an expanded view of the self-winding hose reel 102, according to an example embodiment. As shown in FIGS. 4, 5, 6, the housing 406 of the self-winding hose reel 102 (shown in FIG. 4) may include a front housing part 416 and a rear housing part 418. The self-winding hose reel 102 may further include a drum 506 disposed inside the front housing part 416 and a sleeve shaft 508 fixed in the front housing part 416. The self-winding hose reel 102 may further include a water intake 420 and water outlet 414 with a stop block 422 arranged on the housing 406. The self-winding hose reel 102 may further include a water hose 512 wrapped on the drum 506. The stop block 422 may be arranged around the water hose 512 to prevent the water hose 512 from being retracted completely into the housing 406. The self-winding hose reel 102 may further include a first spring 516 placed around the sleeve shaft 508 inside the drum 506. In an example embodiment, the first spring 516 may include a coil spring, a volute spring, and any other applicable type of the spring. When pulling out the water hose 512, the drum 506 rotates and compresses the first spring 516 around the sleeve shaft 508, so that the compressed first spring 516 can rotate the drum 506 to automatically retract the water hose 512.

The self-winding hose reel 102 may further include a first side disc 518 placed onto the sleeve shaft 508 on one side of the drum 506 and a second side disc 520 placed onto the sleeve shaft 508 on the other side of the drum 506. The first side disc 518 and the second side disc 520 may enclose the space in which the water hose 512 can be wound on the drum 506.

Figure 7A:
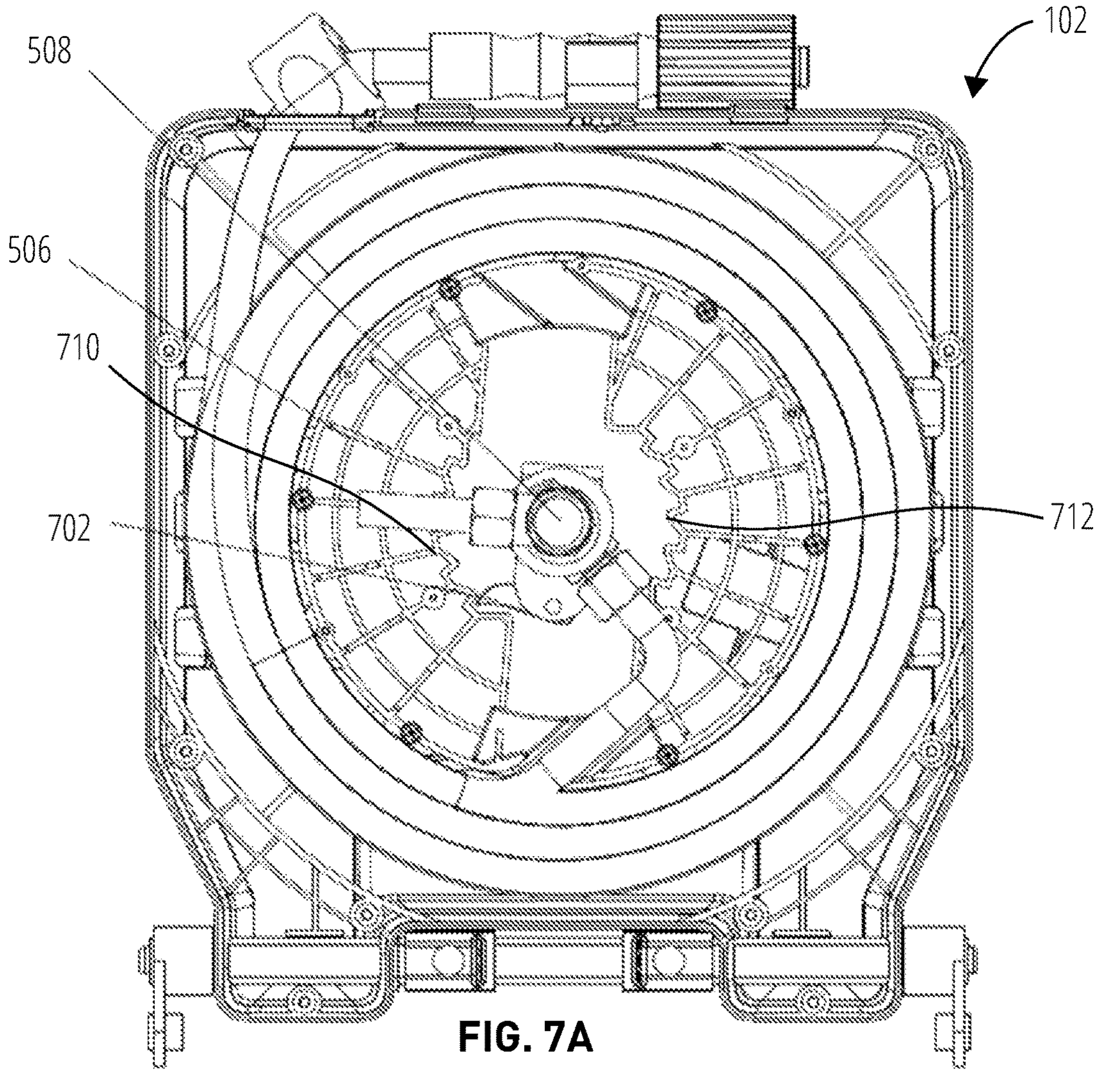
FIG. 7A is a front view of a self-winding hose reel, according to an example embodiment.

FIG. 7A is a front view of the self-winding hose reel 102, according to an example embodiment. The self-winding hose reel 102 may further have a pawl 702.

Figure 7B:
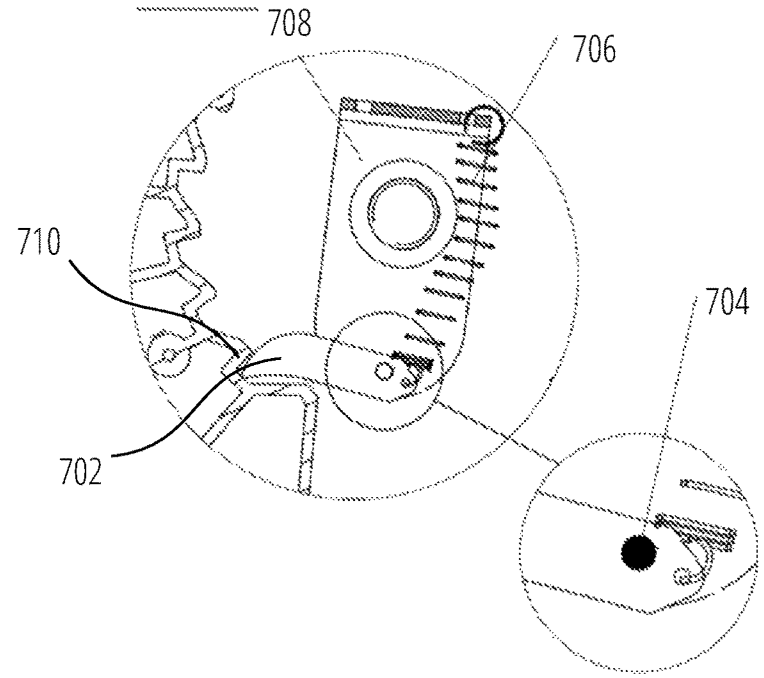
FIG. 7B is a detailed view of a pawl of a self-winding hose reel, according to an example embodiment.

FIG. 7B is a detailed view of the pawl 702 of the self-winding hose reel 102, according to an example embodiment. The pawl 702 may be mounted on a bracket 708 with a pin 704. The bracket 708 may be welded on the sleeve shaft 508. The pawl 702 may be pre-loaded by a second spring 706 at the end, so that the spring-loaded pawl 702 can swivel in a predetermined range. A first teethed edge 710 and a second teethed edge 712 (shown in FIG. 7A) may be arranged on the drum 506 for engagement with the pawl 702.

Figure 8A:
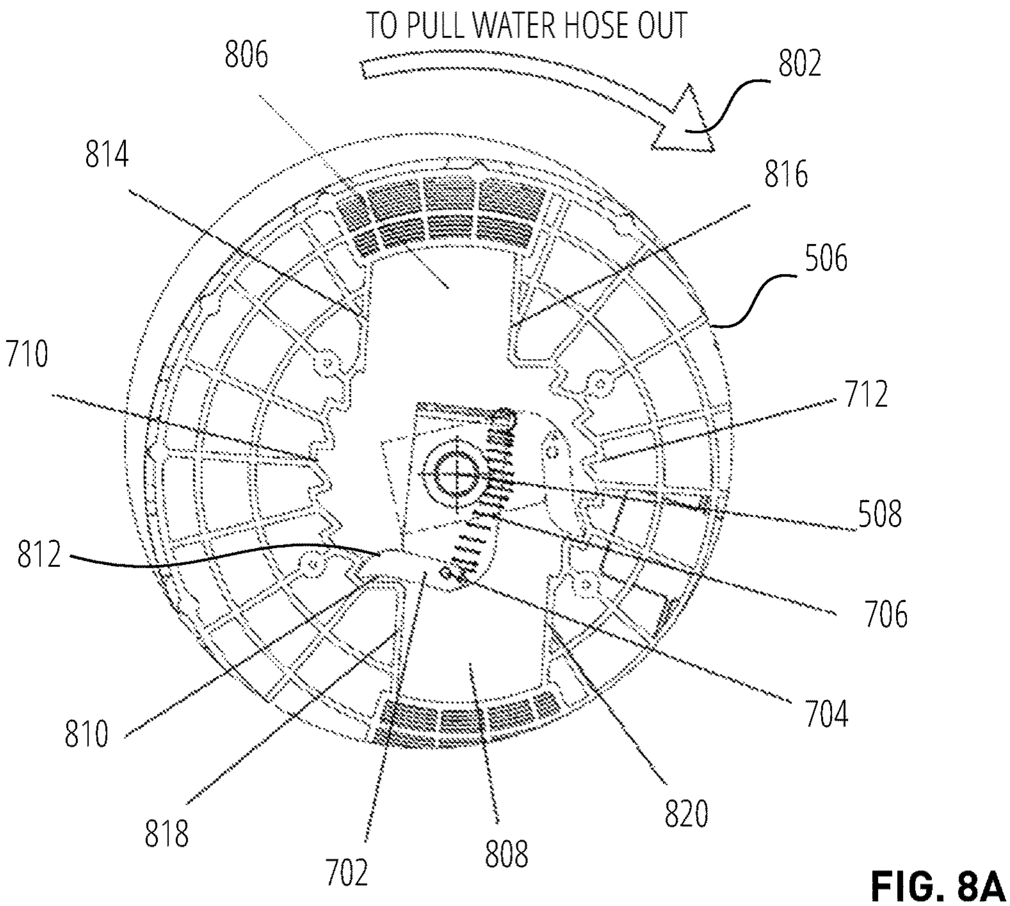
FIG. 8A illustrates rotation of a drum to pull a water hose out of a self-winding hose reel, according to an example embodiment.
Figure 8B:
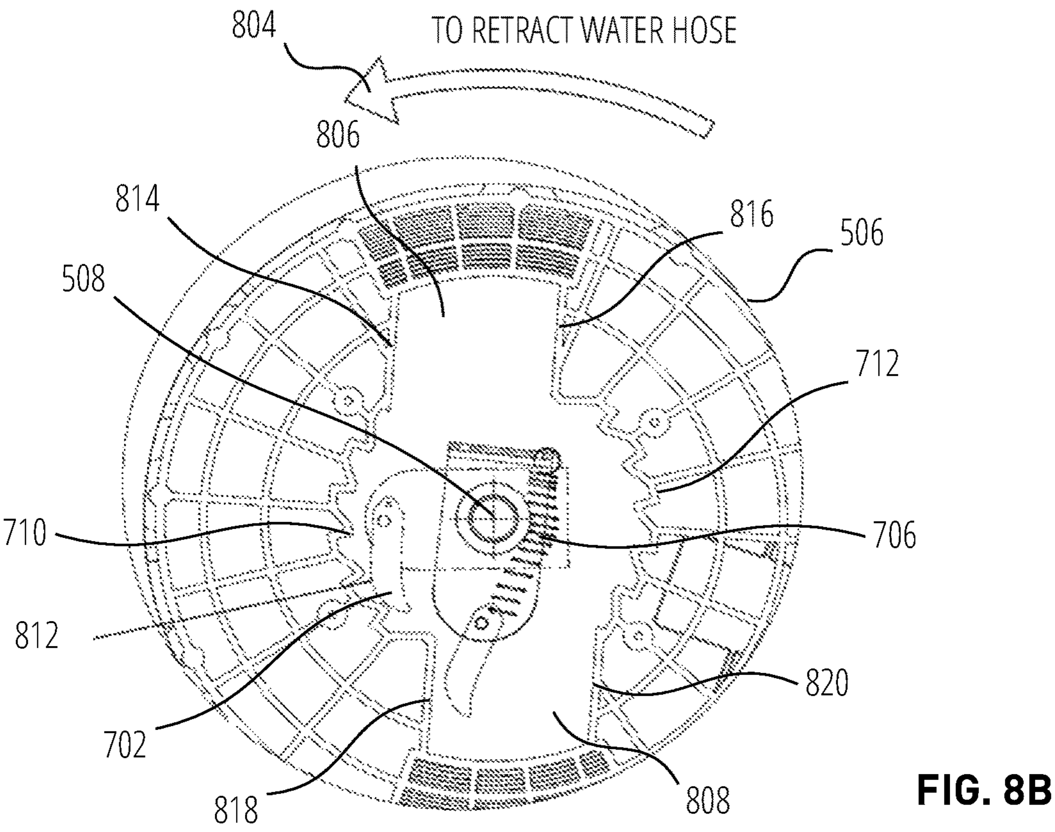
FIG. 8B illustrates rotation of a drum to retract a water hose into a self-winding hose reel, according to an example embodiment.

FIG. 8A illustrates rotation of the drum 506 to pull the water hose 512 out of the self-winding hose reel 102, according to an example embodiment. FIG. 8B illustrates rotation of the drum 506 to retract the water hose 512 into the self-winding hose reel 102, according to an example embodiment.

As shown in FIG. 8A, when pulling out the water hose 512, the drum 506 rotates clockwise (as shown by a first arrow 802) and the first spring 516 is compressed. The pawl 702 may include a pawl face portion 810 and a pawl back portion 812. The pawl 702 skids over the first teethed edge 710 and the second teethed edge 712 of the drum 506 smoothly. When stopping pulling out the water hose 512, the drum 506 rotates counterclockwise slightly by the force of the compressed first spring 516 until the pawl 702 engages, by the pawl face portion 810, one tooth on the first teethed edge 710 or the second teethed edge 712 to block the rotation.

To activate the automatic retraction of the water hose 512, the water hose 512 may be further pulled out for a predetermined distance until the pawl 702 reaches either a first teeth-free area 806 or a second teeth-free area 808. The first teeth-free area 806 may be separated from the first teethed edge 710 by a first edge 814 and separated from the second teethed edge 712 by a second edge 816. The second teeth-free area 808 may be separated from the first teethed edge 710 by a third edge 818 and separated from the second teethed edge 712 by a fourth edge 820.

As shown in FIG. 8B, during the counterclockwise rotation of the drum 506 (as shown by a second arrow 804), the pawl back portion 812 skids over the first teethed edge 710 and the second teethed edge 712, which does not block the rotation of the drum 506, and the compressed first spring 516 retracts the water hose 512 automatically.

Figure 9:
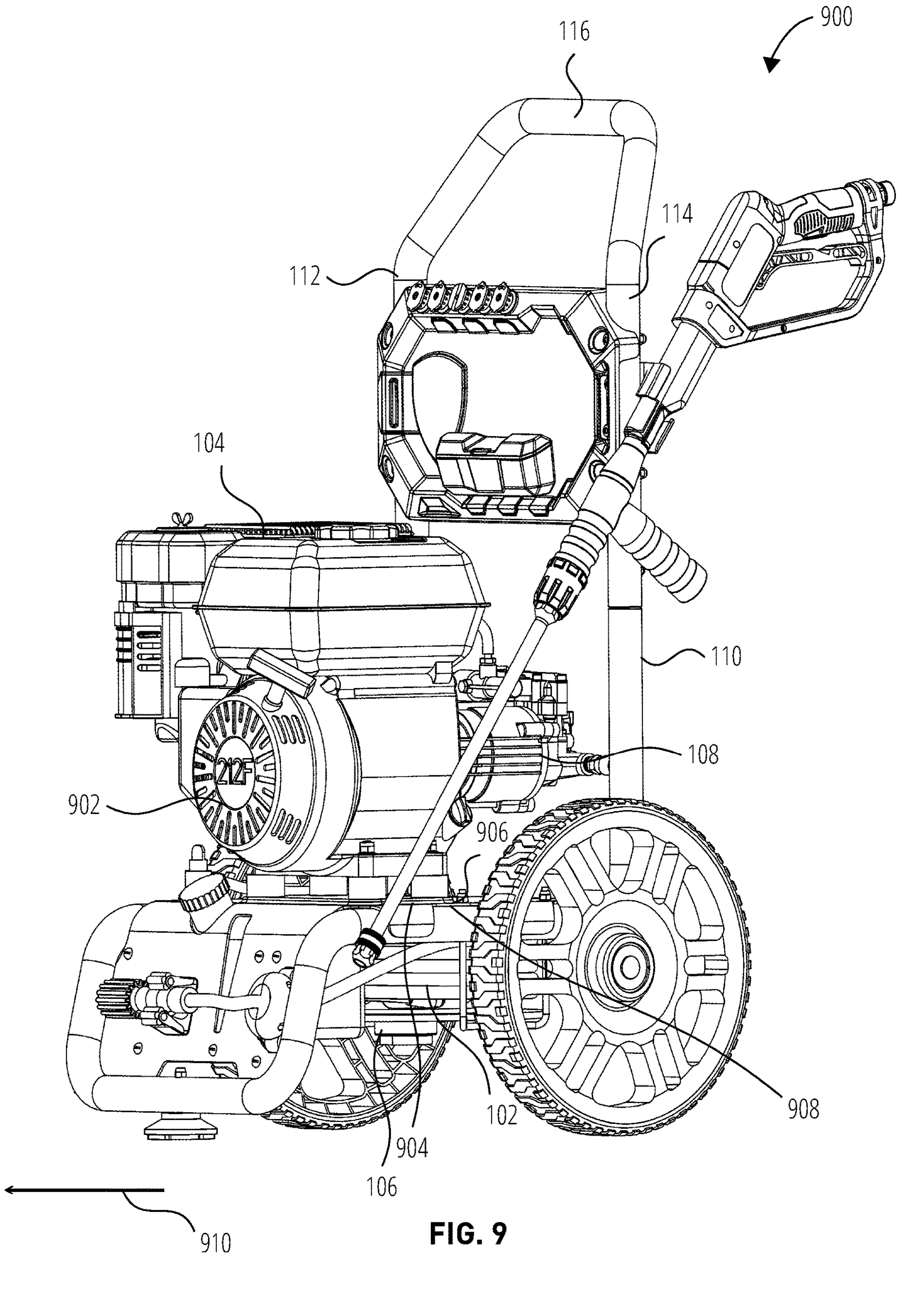
FIG. 9 is a front perspective view of an assembly for high-pressure cleaning with a horizontal shaft engine powered pressure washer, a self-winding hose reel, and a vertical type handle, according to an example embodiment.
Figure 10:
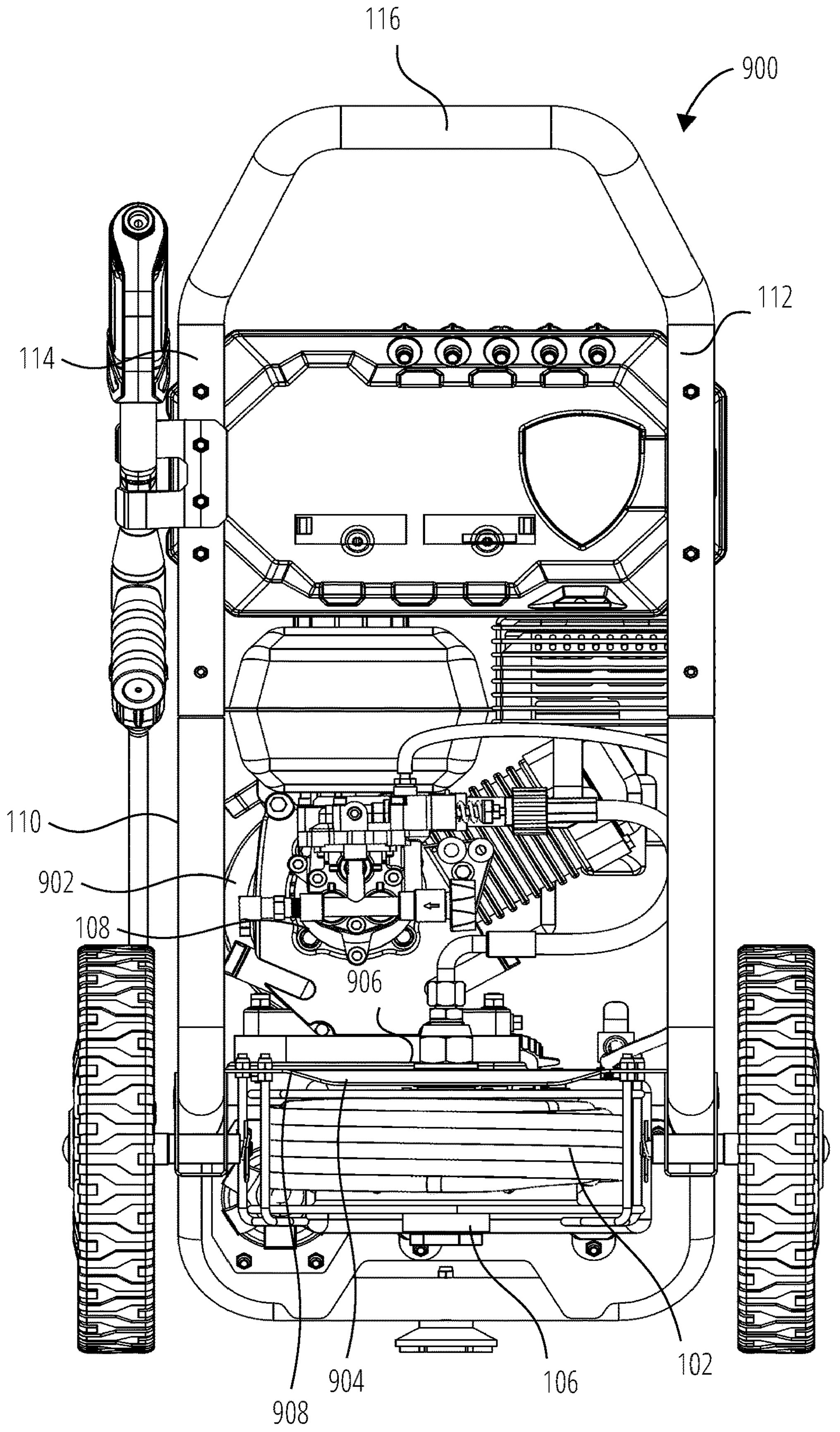
FIG. 10 is a rear view of an assembly for high-pressure cleaning with a horizontal shaft engine powered pressure washer, a self-winding hose reel, and a vertical type handle, according to an example embodiment.

FIG. 9 and FIG. 10 illustrate an assembly 900 for high-pressure cleaning, according to an example embodiment. FIG. 9 is a front perspective view of the assembly 900 for high-pressure cleaning. FIG. 10 is a rear view of the assembly 900 for high-pressure cleaning.

The assembly 900 may include a self-winding hose reel 102, a pressure washer 104, and a fastening mechanism 106 designed to secure the self-winding hose reel 102 to the pressure washer 104.

The pressure washer 104 may include a frame 110. The frame 110 may provide structural support and protection for the components of the pressure washer 104. The frame 110 may include a first side pipe 112 and a second side pipe 114 parallel to the first side pipe 112. The fastening mechanism 106 may be configured to secure the self-winding hose reel 102 to the frame 110 between the first side pipe 112 and the second side pipe 114. The frame 110 may further include a handle 116 connecting the first side pipe 112 and the second side pipe 114. A user may use the handle 116 to navigate the assembly 900.

The assembly 900 is a vertical style pressure washer, in which a handle 116 of the frame 110 is a vertical type handle, i.e., extends vertically. The pressure washer 104 may be powered by a horizontal shaft engine 902. Therefore, the assembly 900 is a horizontal shaft engine powered pressure washer with a self-winding hose reel and a vertical type handle.

The pressure washer 104 may further include a pump 108. The pump 108 may be located beside the horizontal shaft engine 902. For example, the pump 108 may be located on an axis of a shaft of the horizontal shaft engine 902.

In the example embodiment shown in FIG. 9 and FIG. 10, the self-winding hose reel 102 may be secured under the horizontal shaft engine 902, i.e., on the bottom of the pressure washer 104. The self-winding hose reel 102 may be attached by the fastening mechanism 106 to the frame 110 of the pressure washer 104.

In the example embodiment, the frame 110 may include a platform 904 arranged between the first side pipe 112 and the second side pipe 114. The horizontal shaft engine 902 may be arranged on a first surface 906 of the platform 904 and the self-winding hose reel 102 may be arranged on a second surface 908 of the platform 904 and below the horizontal shaft engine 902. The first surface 906 may be opposite to the second surface 908 of the platform 904. The pump 108 may be mounted on the shaft of the horizontal shaft engine 902. The pump 108 may not touch the platform 904.

The self-winding hose reel 102 may be arranged on the frame 110 to extend a water hose located in the self-winding hose reel 102 in the direction outwards from a front side of the assembly 900, as shown by an arrow 910 in FIG. 9.

Figure 11:
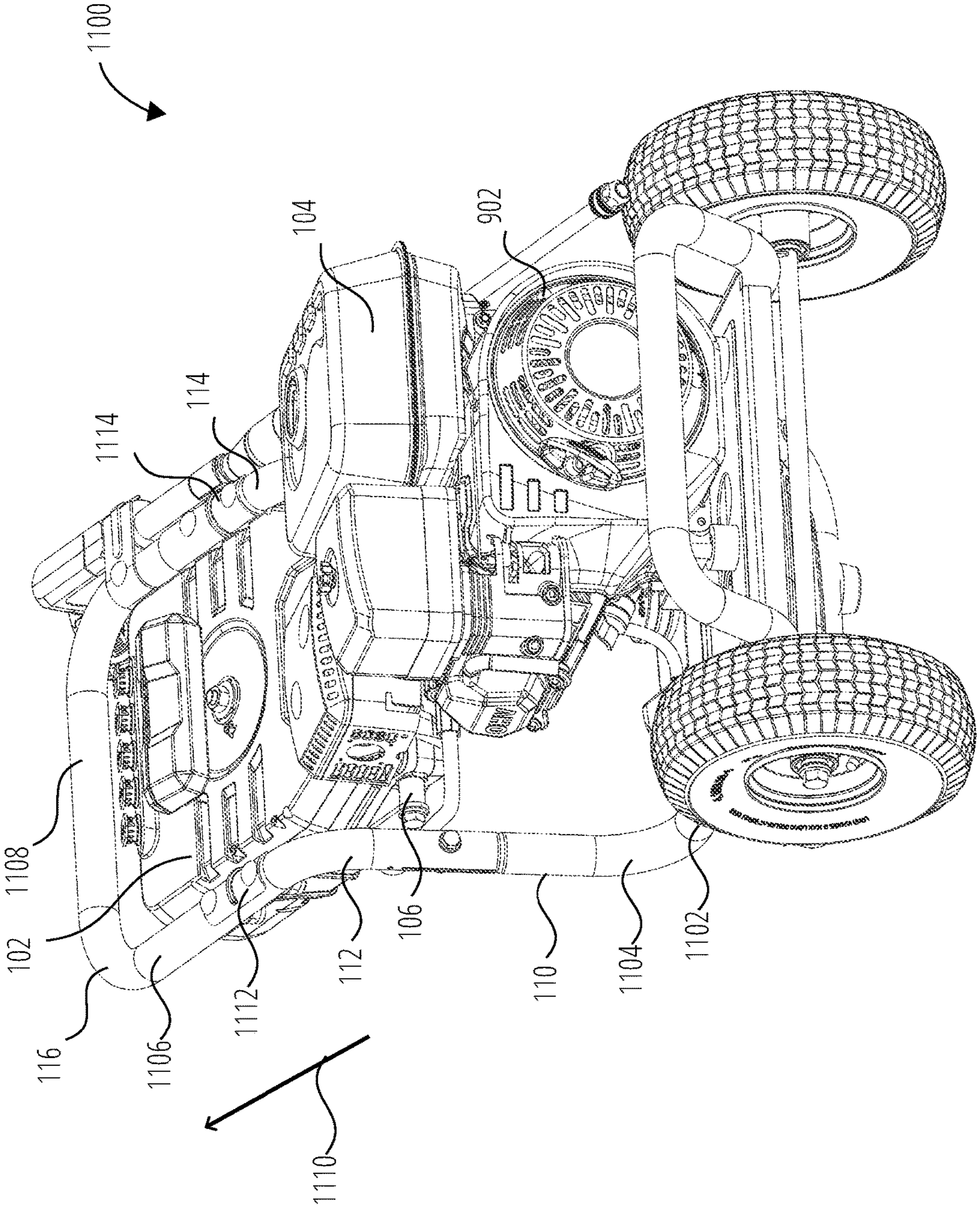
FIG. 11 is a front perspective view of an assembly for high-pressure cleaning with a horizontal shaft engine powered pressure washer, a self-winding hose reel, and a horizontal type handle, according to an example embodiment.
Figure 12:
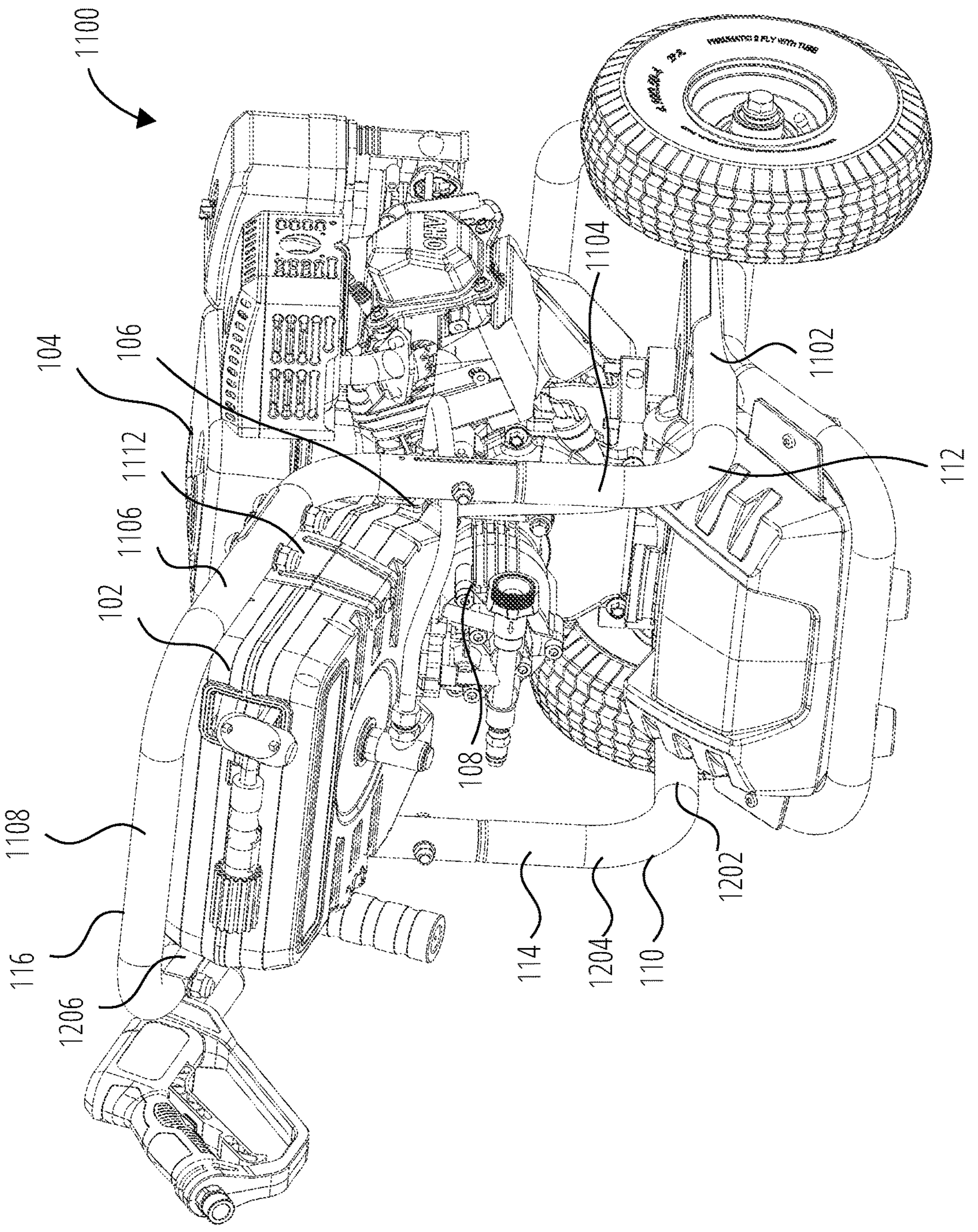
FIG. 12 is a rear perspective view of an assembly for high-pressure cleaning with a horizontal shaft engine powered pressure washer, a self-winding hose reel, and a horizontal type handle, according to an example embodiment.
Figure 13:
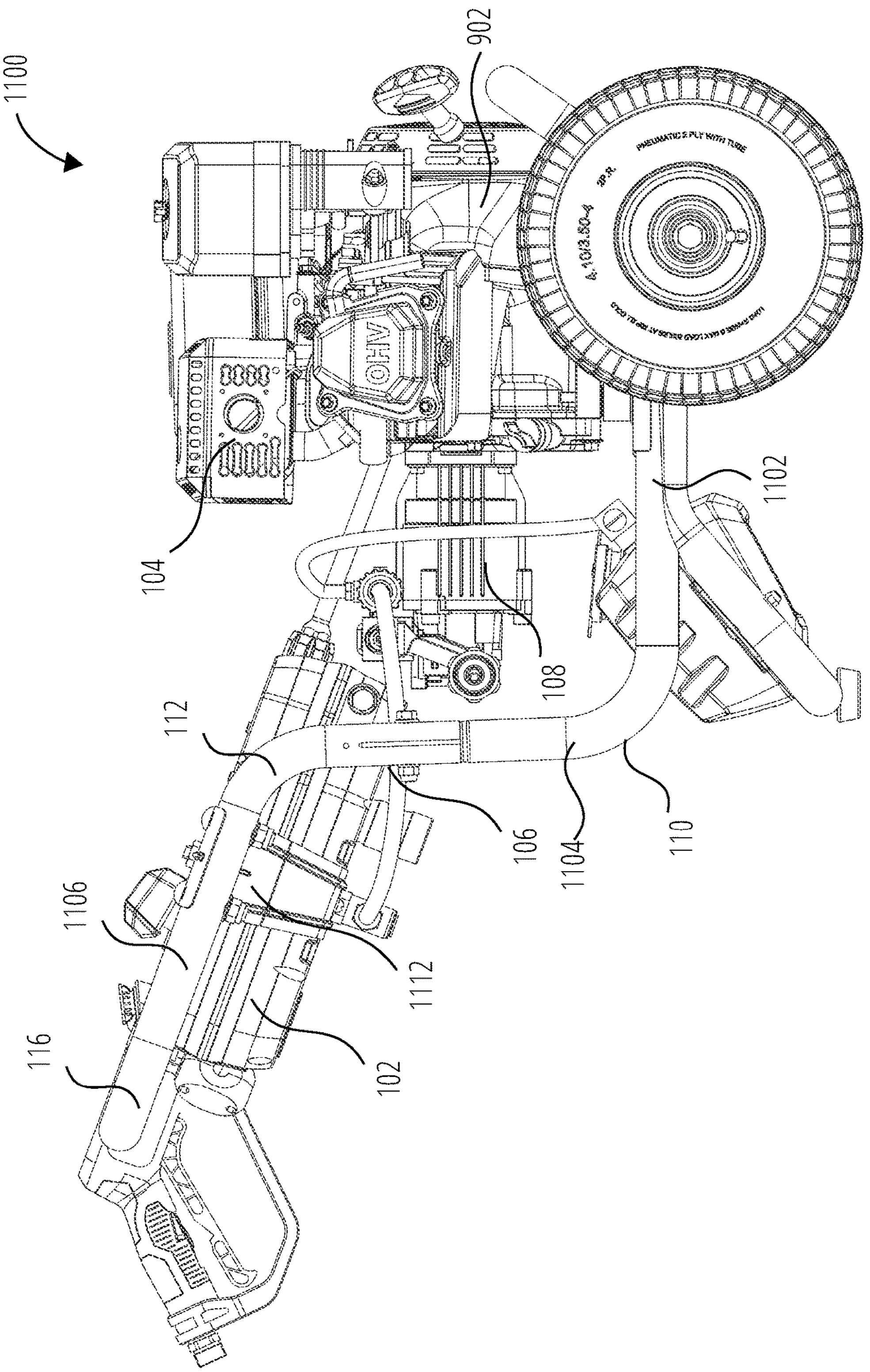
FIG. 13 is a left side view of an assembly for high-pressure cleaning with a horizontal shaft engine powered pressure washer, a self-winding hose reel, and a horizontal type handle, according to an example embodiment.
Figure 14:
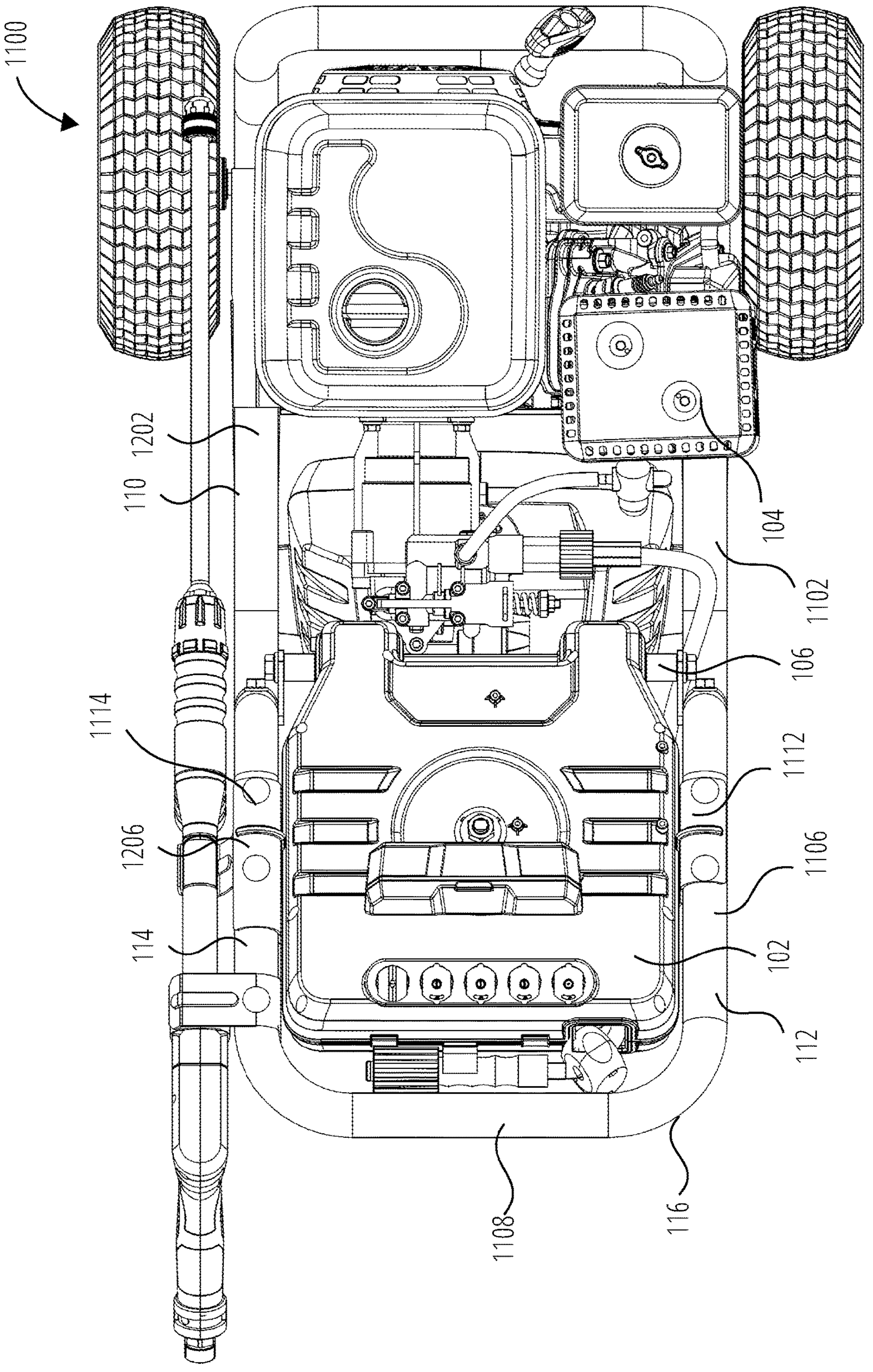
FIG. 14 is a top view of an assembly for high-pressure cleaning with a horizontal shaft engine powered pressure washer, a self-winding hose reel, and a horizontal type handle, according to an example embodiment.

FIGS. 11-14 illustrate an assembly 1100 for high-pressure cleaning, according to an example embodiment. FIG. 11 is a front perspective view of the assembly 1100 for high-pressure cleaning. FIG. 12 is a rear perspective view of the assembly 1100 for high-pressure cleaning. FIG. 13 is a left side view of the assembly 1100 for high-pressure cleaning. FIG. 14 is a top view of the assembly 1100 for high-pressure cleaning.

The assembly 1100 may include a self-winding hose reel 102, a pressure washer 104, and a fastening mechanism 106 designed to secure the self-winding hose reel 102 to the pressure washer 104.

The pressure washer 104 may include a frame 110. The frame 110 may provide structural support and protection for the components of the pressure washer 104. The frame 110 may include a first side pipe 112 and a second side pipe 114 parallel to the first side pipe 112. The fastening mechanism 106 may be configured to secure the self-winding hose reel 102 to the frame 110 between the first side pipe 112 and the second side pipe 114. The frame 110 may further include a handle 116 connecting the first side pipe 112 and the second side pipe 114. A user may use the handle 116 to navigate the assembly 1100.

The assembly 1100 is a horizontal style pressure washer, in which the handle 116 of the frame 110 is a horizontal type handle, i.e., extends horizontally. The pressure washer 104 may be powered by a horizontal shaft engine 902. Therefore, the assembly 1100 is a horizontal shaft engine powered pressure washer with a self-winding hose reel and the horizontal type handle.

The pressure washer 104 may further include a pump 108. The pump 108 may be located beside the horizontal shaft engine 902. For example, the pump 108 may be located on an axis of a shaft of the horizontal shaft engine 902.

The first side pipe 112 of the frame 110 may include a horizontal first side pipe part 1102, a vertical first side pipe part 1104, and an inclined first side pipe part 1106. The second side pipe 114 of the frame 110 may include a horizontal second side pipe part 1202, a vertical second side pipe part 1204, and an inclined second side pipe part 1206. The inclined first side pipe part 1106 and the inclined second side pipe part 1206 of the frame 110 may be connected by a frame connecting part 1108. The inclined first side pipe part 1106, the inclined second side pipe part 1206, and the frame connecting part 1108 may constitute the handle 116 of the assembly 1100.

In an example embodiment, the fastening mechanism 106 may be connected to the handle 116. For example, one side of the fastening mechanism 106 may be connected to a point of connection of the vertical first side pipe part 1104 and the inclined first side pipe part 1106, and the other side of the fastening mechanism 106 may be connected to the point of connection of the vertical second side pipe part 1204 and the inclined second side pipe part 1206. In an example embodiment, the self-winding hose reel 102 may be disposed on the handle 116 parallel to the inclined first side pipe part 1106 and the inclined second side pipe part 1206.

In an example embodiment, the self-winding hose reel 102 may be disposed on the handle 116 parallel to the inclined first side pipe part 1106 and the inclined second side pipe part 1206. The assembly 1100 may further have a first bracket 1112 for connecting the self-winding hose reel 102 to the inclined first side pipe part 1106 of the frame 110. The assembly 1100 may further have a second bracket 1114 for connecting the self-winding hose reel 102 to the inclined second side pipe part 1206 of the frame 110.

The self-winding hose reel 102 is arranged on the horizontal type handle 116 to extend a water hose located in the self-winding hose reel 102 in the direction outwards from a rear side of the assembly 1100, as shown by an arrow 1110 in FIG. 11. In the assembly 1100 shown in FIG. 11, the water hose is extended in a direction opposite to the direction of extension of water hoses in the assembly 100 shown in FIG. 2 and the assembly 900 shown in FIG. 9.

Figure 15:
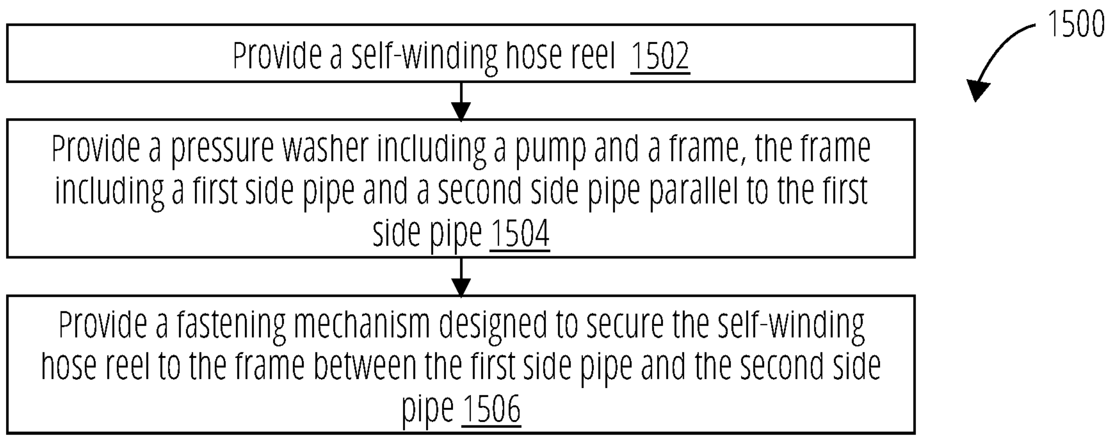
FIG. 15 is a flow chart of a method for manufacturing an assembly for high-pressure cleaning, according to an example embodiment.

FIG. 15 is a flow chart of a method 1500 for manufacturing an assembly for high-pressure cleaning, according to an example embodiment. In some embodiments, the operations may be combined, performed in parallel, or performed in a different order. The method 1500 may also include additional or fewer operations than those illustrated.

In block 1502, the method 1500 may commence with providing a self-winding hose reel. In block 1504, the method 1500 may proceed with providing a pressure washer. In an example embodiment, the pressure washer may include an electrically powered high-pressure washer or a gasoline engine powered high-pressure washer. The pressure washer may include a pump and a frame. The frame may include a first side pipe and a second side pipe parallel to the first side pipe. In an example embodiment, assembly may further include an engine. The self-winding hose reel may be secured above the engine.

In block 1506, the method 1500 may proceed with providing a fastening mechanism designed to secure the self-winding hose reel to the frame between the first side pipe and the second side pipe. The fastening mechanism may enable rotation of the self-winding hose reel with respect to a plane formed by the first side pipe and the second side pipe. The fastening mechanism may be configured to secure the self-winding hose reel with respect to the plane formed by the first side pipe and the second side pipe at a pre-determined non-zero angle. In an example embodiment, when the self-winding hose reel is secured at the pre-determined non-zero angle, the self-winding hose reel may be arranged parallel to the pump.

In an example embodiment, the fastening mechanism may include a first plate mounted to the first side pipe and a second plate mounted to the second side pipe. The first plate may include a first pin hole and a second pin hole. The second plate may include a third pin hole and a fourth pin hole. The fastening mechanism may further include a first spring loaded latch pin and a second spring loaded latch pin. The first spring loaded latch pin may be attached to a housing of the self-winding hose reel. The second spring loaded latch pin may be attached to the housing of the self-winding hose reel. When the self-winding hose reel is secured in the plane formed by the first side pipe and the second side pipe, the first spring loaded latch pin may be engaged with the first pin hole and the second spring loaded latch pin may be engaged with the third pin hole. When the self-winding hose reel is secured at the pre-determined non-zero angle, the first spring loaded latch pin may be engaged with the second pin hole and the second spring loaded latch pin may be engaged with the fourth pin hole.

The first plate may include a first limiter and a second limiter. The second plate may include a third limiter and a fourth limiter. The first limiter and the third limiter may be configured to ensure a first position of the self-winding hose reel in the plane formed by the first side pipe and the second side pipe. The second limiter and the fourth limiter may be configured to ensure a second position of the self-winding hose reel at the pre-determined non-zero angle with respect to the plane formed by the first side pipe and the second side pipe.

The fastening mechanism may further include a first button and a second button. The first button may be configured to release the first spring loaded latch pin from either the first pin hole or the second pin hole. The second button may be configured to release the second spring loaded latch pin from either the third pin hole or the fourth pin hole.

In an example embodiment, the frame may further include a platform arranged between the first side pipe and the second side pipe. The assembly may include an engine, such as a horizontal shaft engine. In this embodiment, the horizontal shaft engine may be arranged on a first surface of the platform and the self-winding hose reel may be arranged on a second surface of the platform and below the horizontal shaft engine.

Thus, assemblies for high-pressure cleaning and methods for manufacturing an assembly for high-pressure cleaning have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. An assembly for high-pressure cleaning, the assembly comprising:

a self-winding hose reel;

a pressure washer including a pump and a frame; and a fastening mechanism designed to secure the self-winding hose reel to the frame;

wherein:

the frame includes a first side wheel and a second side wheel parallel to the first side wheel;

the frame includes a platform arranged between the first side wheel and the second side wheel;

the assembly further comprises an engine, the engine being arranged on a first surface of the platform;

the self-winding hose reel is arranged on a second surface of the platform and below the engine; and the self-winding hose reel is secured to the frame between the first side wheel and the second side wheel.

2. The assembly of claim 1, wherein the pressure washer includes one of the following: an electrically powered high-pressure washer and a gasoline engine powered high-pressure washer.

3. A method for manufacturing an assembly for high-pressure cleaning, the method comprising:

providing a self-winding hose reel;

providing a pressure washer including a pump and a frame; and providing a fastening mechanism designed to secure the self-winding hose reel to the frame;

wherein:

the frame includes a first side wheel and a second side wheel parallel to the first side wheel;

the frame includes a platform arranged between the first side wheel and the second side wheel;

the assembly further comprises an engine, the engine being arranged on a first surface of the platform;

the self-winding hose reel is arranged on a second surface of the platform and below the engine; and the self-winding hose reel is secured to the frame between the first side wheel and the second side wheel.

4. The method of claim 3, wherein the pressure washer includes one of the following: an electrically powered high-pressure washer and a gasoline engine powered high-pressure washer.

* * * * *